United States Patent [19]
Hiraga et al.

[11] Patent Number: 6,121,604
[45] Date of Patent: Sep. 19, 2000

[54] OPTICAL PROBE, METHOD OF MANUFACTURING AN OPTICAL PROBE, AND SCANNING PROBE MICROSCOPE

[75] Inventors: Takashi Hiraga; Tetsuo Moriya; Akihiro Mito, all of Tsukuba; Masamichi Fujihira, Kawasaki; Hiroshi Muramatsu; Noritaka Yamamoto, both of Chiba, all of Japan

[73] Assignees: The Head of Agency of Industrial Science and Technology; Seiko Instruments Inc., both of Japan

[21] Appl. No.: 09/064,480

[22] Filed: Apr. 22, 1998

[30] Foreign Application Priority Data

Apr. 23, 1997 [JP] Japan .................... 9-106430
Mar. 3, 1998 [JP] Japan .................... 10-051167

[51] Int. Cl.$^7$ .................................................. G12B 21/06
[52] U.S. Cl. .................................. 250/216; 250/234
[58] Field of Search .................................... 250/216, 234, 250/235, 305, 306, 307, 309, 310; 369/44.23, 44.34, 58, 112, 121, 119

[56] References Cited

U.S. PATENT DOCUMENTS 5,734,632  3/1998  Ito et al. ........................ 369/44.23

FOREIGN PATENT DOCUMENTS

636914A1  2/1995  European Pat. Off. .
752601A1  1/1997  European Pat. Off. .

OTHER PUBLICATIONS

Jiang S. et al.: "Reflection–Resonance–Type Photon Scanning Tunneling Microscope", Japanese Journal of Applied Physics, vol., 33, No. 1A, Part 02, Jan. 1, 1994, pp. 55–58.

*Primary Examiner*—John R Lee
*Attorney, Agent, or Firm*—Admas & Wilks

[57] ABSTRACT

An optical probe is used in a near-field effect microscope for performing topographical observation and physical property measurement on a surface of a sample. The optical probe comprises an optical resonator having an optical fiber having at least one microscopic projection composed of a dielectric material disposed at an end portion of the optical fiber for transmitting light.

36 Claims, 4 Drawing Sheets

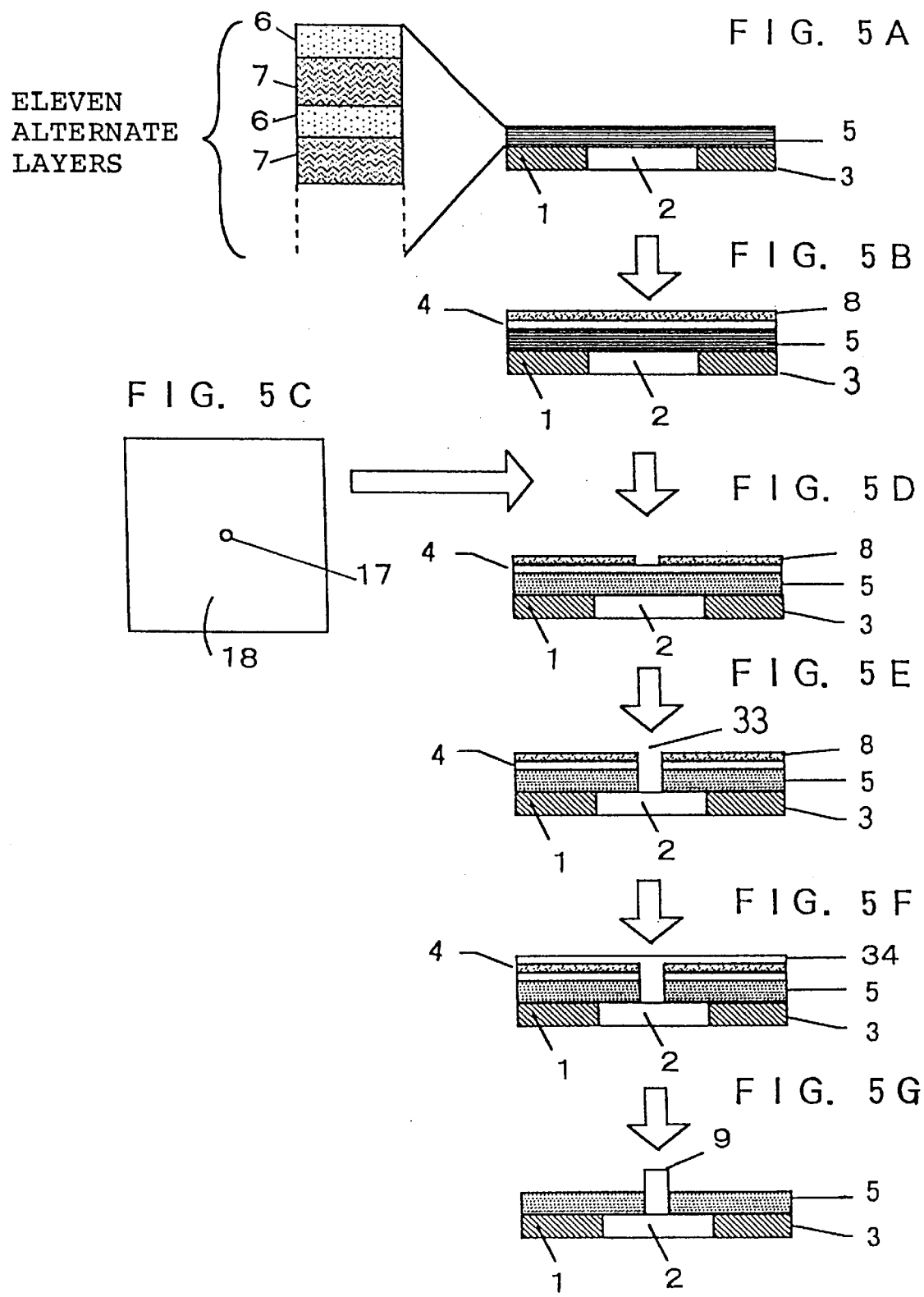

OPTICAL PROBE, METHOD OF MANUFACTURING AN OPTICAL PROBE, AND SCANNING PROBE MICROSCOPE

BACKGROUND OF THE INVENTION

This invention relates to an optical probe used in a near-field effect microscope for a purpose of observing topography or measuring photo-physical properties at a solid surface in ranges of nano-meter by optically illuminating or photo-exciting a surface to be measured, a method of manufacturing the optical probe, a scanning probe microscope using this optical probe.

Conventionally, there has been used a probe possessing a microscopic aperture as an optical probe for near-field effect microscopes. As this microscopic-aperture optical probe, a basic principle is disclosed in U.S. Pat. No. 4,604,520. The basic structure has a metal coating formed in a thickness of less than 200 nano-meter over a portion, excepting a tip portion, of a quartz rod with sharply edged tip to form an aperture smaller than the wavelength of light at the tip. An evanescent field can be formed at the microscopic aperture portion at the tip by introducing light through a light inlet port provided on the opposite side to the aperture of the probe. Besides this, as a method for forming such an optical probe having a microscopic aperture is disclosed in J. Vac. Sci. Technol. B3, 386 (1985), wherein a metal film is deposited on a glass surface having fine particles put thereon and thereafter the fine particles are removed to form a microscopic aperture. Also, there is disclosed a probe manufacturing method in U.S. Pat. No. 4,917,462 wherein a glass tube is extended by heat until it is fractured to coat a metal film over a lateral surface of the glass so that a tip hole of a thinned glass tube is made as a microscopic aperture. Moreover, U.S. Pat. No. 5,272,330 discloses a probe manufacturing method that an optical fiber is extended until it is thermally fractured to metal-coat a lateral surface, making a microscopic aperture at a tip portion of the thinned optical fiber.

In the meanwhile, there is a disclosure as a functional probe by Lewis et al. in Nature 354, 1991, p. 214 that light is introduced into a functional probe of a glass tube having a probe tip packed with a fluorescent substance to use fluorescent light as a microscopic light source. This method, however, involves problems that the microscopic light source wavelength is restricted in selection and the light source intensity gradually decreases due to putting off of the fluorescent light.

The problem in the above microscopic-aperture optical probe lies in that the intensity of the evanescent field at the microscopic aperture greatly decreases 1/10000 to 1/1000 with respect to the intensity of incoming light. This acts to prevent against observations of samples at high S/N or processing/writing at high speed scanning.

SUMMARY OF THE INVENTION

It is an object of the present invention to provide an optical probe and the method of manufacturing an optical probe, which can increase the intensity of the light within the optical probe to increase the strength of the evanescent field created at the microscopic aperture by making an optical probe having a microscopic aperture as an optical resonator or a part thereof, despite the conventional optical probe utilizing a near-field effect suffers large attenuation in strength of the evanescent field with respect to the incoming light.

It is a further object of the present invention to provide a scanning probe microscope which can carry out scanning probe microscope observations with high S/N ratio. This can contribute to broaden the application range for fluorescent image observations, Raman spectroscopy in a microscopic range, time-resolved spectroscopy. Also, in memory applications write speed can be increased.

BRIEF DESCRIPTION OF THE DRAWINGS

FIGS. 5A, 5B, 5C, 5D, 5E, 5F and 5G are manufacture process views showing the optical probe of the present invention;

DETAILED DESCRIPTION OF THE PREFERRED EMBODIMENTS

This invention provides, in order to solve the above-stated problem, an optical probe which is characterized by an optical resonator or part thereof formed by an optical probe having a microscopic aperture so as to increase the intensity of the light within the optical probe so that an evanescent field formed at the microscopic aperture portion is increased as compared to the conventional method.

The present invention is characterized by an optical resonator constituted by an optical fiber, as it is, that has a microscopic aperture having a diameter of approximately from 50 nano-meter to 200 nano-meters, wherein light is externally incident onto this so as to strengthen the photoelectric field within the optical fiber higher than the case of not forming the optical resonator, thereby increase the intensity of evanescent waves radiated through the microscopic aperture. In a detailed structural example of the optical resonator, a dielectric multilayered film or a metal thin film with a reflectivity of 95% or higher, preferably 99% or higher, is coated over an end face on a side for providing a microscopic aperture, and then a microscopic aperture is provided. The fiber having a length of several cm at the other end is worked by optical polish to a planar accuracy of $\lambda/20$ or finer and parallelism of 1" or smaller, and then coated with a dielectric multilayered film having a reflectivity of 85–90% so that laser light is introduced from this surface through an objective lens for microscopes as an optical coupler. The light confined within the optical fiber is amplified within this resonator while it reciprocates between the dielectric multilayered films or metal films placed on the opposite ends, so that an evanescent light with a strong electric field strength can be withdrawn through the microscopic aperture.

Explanations will be made hereinbelow on an embodiment of the present invention with reference to the drawings.

Figure 1:
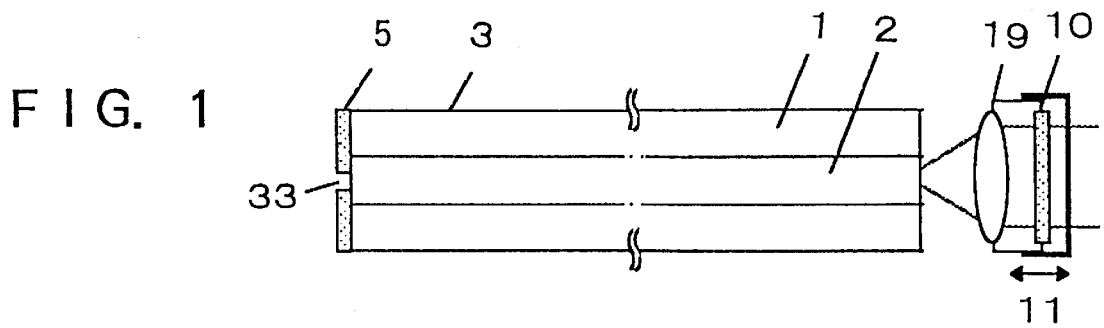
FIG. 1 is a structural view showing a first embodiment of an optical probe of the present invention.

FIG. 1 is a view representing a structure of an optical probe showing a first embodiment of the present invention. The optical probe is constituted by an $SiO_2$ fiber 3 formed by a core layer 2 for propagating light and a cladding layer 1 having a different refractive index therefrom so that it is formed, at one end face, with a dielectric multilayered film 5 of $MgF_2/ZrO_2$ and a microscopic transmission bore 33. A coupling lens 19 and an inner-side dielectric multilayered film 10 are provided on the other end face side. This dielectric multilayered film 10 is movable in directions shown by the arrows by a resonator length/parallelism adjusting mechanism 11 so that the resonator can be adjusted in its length and parallelism. The resonator is enhanced in Q factor by this adjustment. The resonator length/parallelism adjusting mechanism 11 is constituted by a piezoelectric element so as to determine a moving amount of the dielectric multilayered film by controlling the voltage applied. Here, as the $SiO_2$ fiber 3 can be employed a single mode fiber, a step index fiber, a graded index fiber, a polarization plane holding fiber, or the like. Also, the coupling lens 19 can be placed inside the dielectric multilayered film 10 and the optical fiber, or outside thereof. Meanwhile, as the coupling lens can be employed an objective lens for microscopes, an objective lens used through a refractive index aligning oil, or the like. It is possible to modulate the light coming from the optical probe by the length adjusting mechanism for the resonator. The structure of the optical probe as described above can amplify the light introduced into the inside of the optical probe by the optical resonator so that the evanescent light withdrawn through a tip of the optical probe is intensified, enabling measurement in a brief time and high-speed scanning upon writing into a memory or the like.

Figure 2:
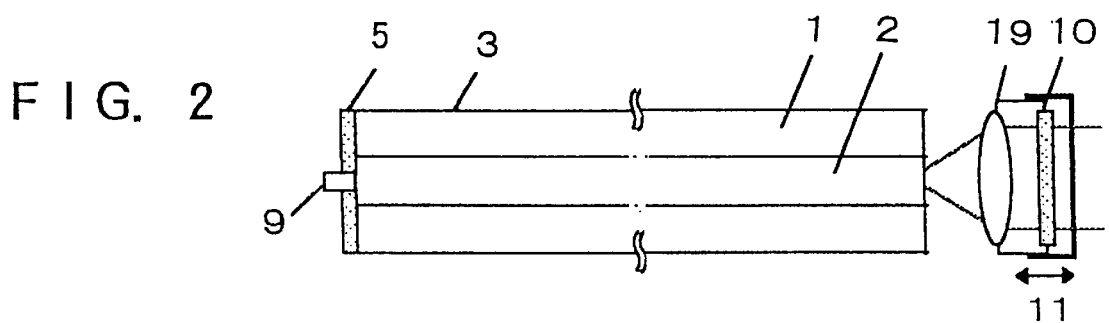
FIG. 2 is a structural view showing a second embodiment of the optical probe of the present invention.

FIG. 2 shows a structure of an optical probe showing a second embodiment of the present invention. A microscopic projection 9 is provided in place of the microscopic bore 33, which is advantageous for observing a sample surface with a large roughness. The effect and operation of the invention is not different from those shown in the first embodiment except that the shape of a tip portion of the optical probe is different, thus omitting explanations.

Figure 3:
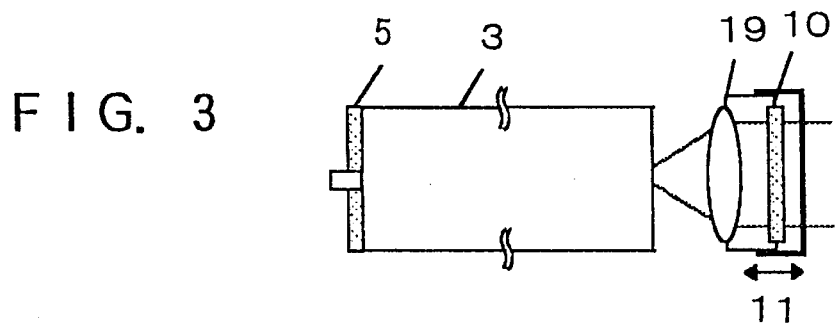
FIG. 3 is a structural view showing a third embodiment of the optical probe of the present invention.

FIG. 3 shows a structure of an optical probe showing a third embodiment of the present invention. Since the optical probe uses as its material a quartz rod having a length of approximately 100 $\mu$m and the probe size can be reduced, it is possible to use as a probe chip like a cantilever. Also, the dielectric multi-layered film can be utilized as a reflecting mirror for optical levers. The effect and operation of the invention is not different from those shown in the first embodiment except that the shape of a tip portion of the optical probe is different, thus omitting explanations.

Figure 4:
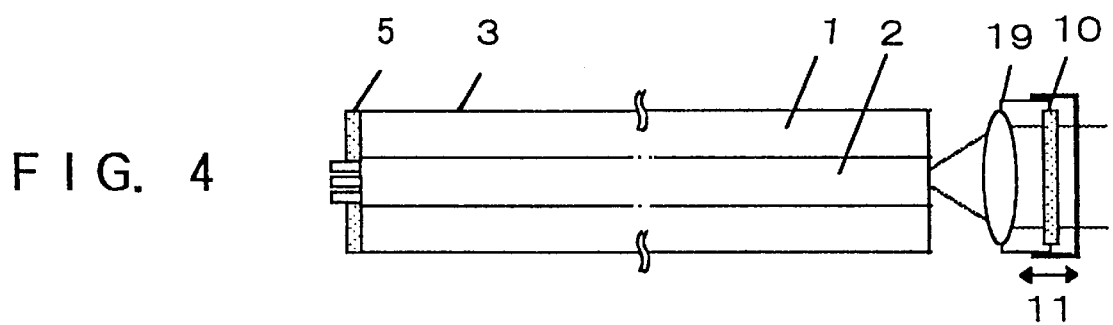
FIG. 4 is a structural view showing a fourth embodiment of the optical probe of the present invention.

FIG. 4 shows a structure of an optical probe showing a fourth embodiment of the present invention. The optical probe has, at its tip, a plurality of microscopic projections formed of $SiO_2$. It is advantageous for observing the movement of excited energy causing between atoms or molecules present at a distance between the projections. Although in this embodiment 9, i.e. 3×3, of microscopic projections are exemplified, the number of the projections is not limited to this. The effect and operation of the invention is not different from those shown in the first embodiment except that the shape of a tip portion of the optical probe is different, thus omitting explanations.

FIGS. 5A, 5B, 5C, 5D, 5E, 5F and 5G show fabricating processes of the optical probe of the present invention. First, in a vacuum depositing apparatus, there are disposed an $SiO_2$ optical fiber 3 as a single-mode optical fiber having mirror-polished end faces to have a length of approximately 20 cm, $MgF_2$ and $ZrO_2$ as a thin film material, and Cr as a metal mask material, and vacuum evacuation is made down to a pressure of approximately $10^{-5}$ Pa. Thereafter, $ZrO_2$ as one material is evaporated by means of an electron-beam melting method, a resistance heating method, or the like. A $ZrO_2$ layer 6 is deposited to a film thickness of 97.56 nm so that the product of the $ZrO_2$ refractive index 2.05 and the film thickness becomes 200 nm that is a quarter of a wavelength due to a light source used. At this time, an oxygen gas is introduced into the vacuum apparatus in order not to encounter deviation from a stoichiometric composition. Then, $MgF_2$ is evaporated similarly to the case of $ZrO_2$ to deposit an $MgF_2$ layer 7 to a film thickness of 144.93 nm so that the product of the $ZrO_2$ refractive index 1.38 and the film thickness becomes 200 nm that is a quarter of a wavelength due to the light source used. FIG. 5A shows an optical fiber that is deposited with eleven alternate layers of $ZrO_2$ layers 6 and $MgF_2$ layers 7 by repeating that steps.

Thereafter, a Cr layer 4 is deposited to a film thickness of approximately 1 $\mu$m as a mask for dry-etch the $MgF_2/ZrO_2$ layer 5 (dielectric multilayered film). Then it is removed from the vacuum apparatus, photoresist 8 is applied by a spin coater or the like to a film thickness of approximately 1 $\mu$m. Here, TiN, TiW or the like may be used in place of Cr. FIG. 5B shows a state of cumulating with these films.

A photomask 18 is made, which is patterned with a bore 17 opened by ion-beam to a diameter of 500 nm as shown in FIG. 5C. An optical fiber of FIG. 5B applied with the photoresist 8 is subjected to reduced-projection exposure (1/5), and placed in a vacuum apparatus provided with both a dry etch mechanism and a CVD mechanism. FIG. 5D shows a state that the potoresist 8 is made to a pattern of FIG. 5C. Then, the Cr layer 4 (metal mask layer) is etched by using a reactive gas such as $Cl_2$ to be formed into a mask for etching the dielectric multilayered film 5 ($MgF_2/ZrO_2$ layer).

Then, the $ZrO_2$ layer is etched using the reactive gas such as $Cl_2$, followed by etching the $MgF_2$ layer using the reactive gas such as $Cl_2$. Then, the $ZrO_2$ layer is etched again using the reactive gas such as $Cl_2$. FIG. 5E shows a view wherein a bore 33 with a diameter of 100 nm is opened by repeating the etchings alternately.

In order to implement as a manufacture method of forming a thin dielectric multilayered film with a reflectivity of approximately 85–90% on the end face of the fiber, a fluorine-based gas such as $C_2F_6$ or the like or a chlorine-based gas such as $Cl_2$ or the like or a gas containing both such as $ClF_3$ or the gas mixture of them is introduced, into a vacuum apparatus, for alternately deposit a dielectric thin film with a low refractive index such as $MgF_2$, $SiO_2$ or the like and a dielectric thin film with a high refractive index such as $ZrO_2$, $TiO_2$, $TaO_4$ or the like. It is possible to combine a dry etch method that uses plasma caused by applying a high-frequency high voltage to an electrode installed in the vacuum chamber, with a mask forming method that uses photoresist employed for semiconductor manufacturing process and a reduced-projection exposure method. It is possible to adopt, for them, every known techniques as to the dielectric substance, the etch gas, the form and kind of the electrode, the frequency of the high-frequency wave, the kind of the photoresist, and so on, and not limited to those as described.

The processes so far are satisfactory where manufacturing an optical probe with a microscopic transmission bore. However, where manufacturing an optical probe having a microscopic projection 9 according to the second embodiment of the present invention, the process is further advanced to a next process.

In order to make a microscopic projection 9, an $SiO_2$ layer 34 is first deposited in the 100-nm diameter bore by a CVD mechanism using gasses of $SiH_4$, oxygen and the like. FIG. 5F shows a state that the surface of the optical probe is covered by the $SiO_2$ layer 34.

Thereafter, taking out of the vacuum apparatus, the metal mask is removed by a nitric-acid based stripping solution to make a microscopic projection as shown in FIG. 5G.

Figure 6A:
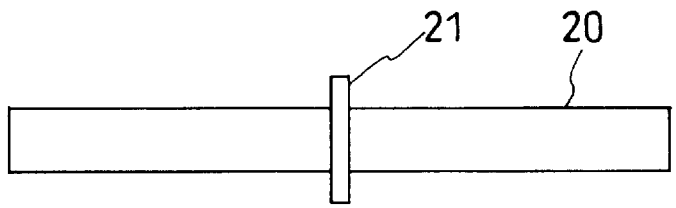
FIGS. 6A and 6B are manufacture process views showing the optical probe of the present invention.
Figure 6B:
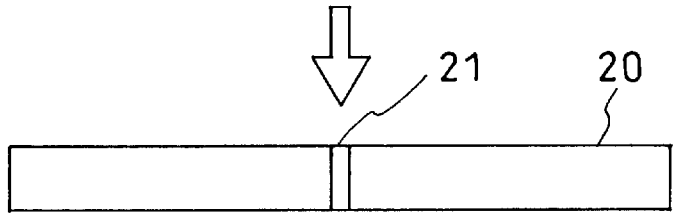

FIGS. 6A and 6B show a manufacturing process for an optical probe shown in the third embodiment of the present invention. A quartz rod is employed for an optical probe material. In order to mirror-polish an end face of a quartz rod 21 having a diameter of 20 $\mu$m, a bore is opened through a center of a stainless-made jig 20 in a 30-mm square with a thickness of 100 $\mu$m so that a quartz rod 21 having a diameter of 20 $\mu$m and a length of 200 $\mu$m is fixed therein through an adhesive (FIG. 6A) and mirror-polished by machine polishing (FIG. 6B). The quartz rod 21 thus made is formed with a dielectric multilayered film ($MgF_2/ZrO_2$ layer) and a microscopic transmission bore 33, thereby making a Fabry-Perot resonator type optical probe. If a process of making a microscopic projection 9 is further performed, an optical probe of the third embodiment shown in FIG. 3 is available.

Figure 7A:
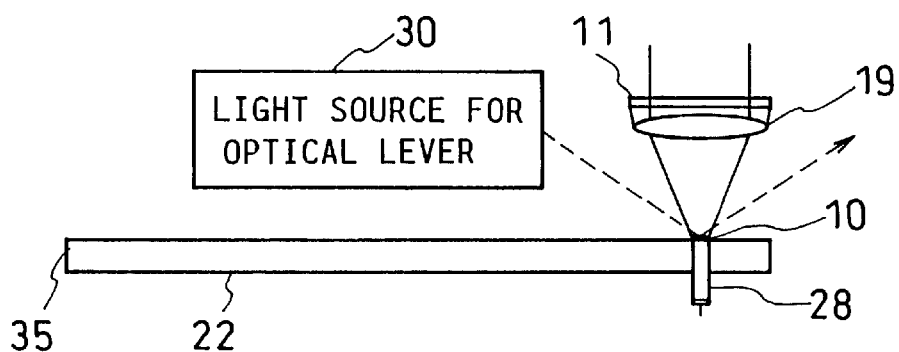
FIGS. 7A and 7B are structural views showing a cantilever using the optical probe of the present invention.
Figure 7B:
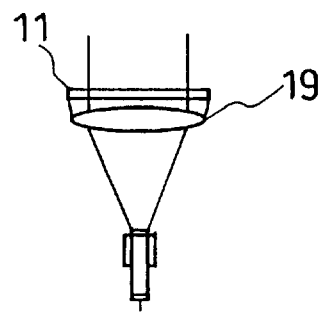

The optical probe thus made is fixed through an adhesive or the like in a bore portion of a holder 22 having a length of several mm, a width of 50 $\mu$m and a height of 50 $\mu$m as shown in FIG. 7A (front view) and FIG. 7B (side view). The holding at a fixed end 35 of the holder 22 enables utilization as a probe chip like a cantilever. That is, the light from an optical-lever light source is introduced in a direction shown in FIG. 7A and an dielectric multilayered film 10 positioned at a terminal end of the optical probe is utilized as a reflecting mirror, thereby functioning as an optical lever.

The optical probe of the fourth embodiment of the present invention can be made in the similar process to the first and second embodiment. There is no difference except for using a pattern having 3×3 of nine bores formed in a photomask.

Figure 8:
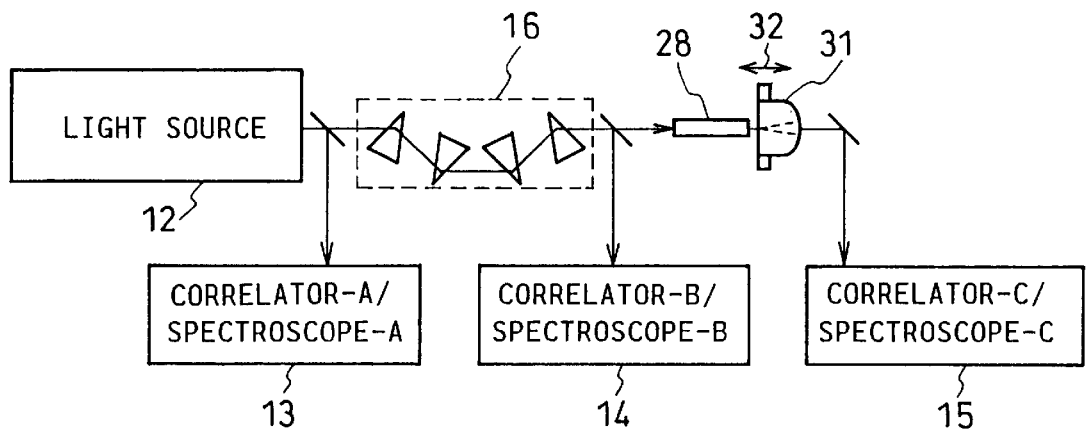
FIG. 8 is a typical view showing an optical system for short-pulse light response characteristic evaluation with an optical fiber probe of the present invention.

FIG. 8 shows an optical system of a short-pulse optical response characteristic evaluating apparatus used for evaluating the optical probes made in the present embodiments. As a light source was used a basic wave of 800 nm and a pulse width of 40 fs of a titanium-sapphire laser. The light coming from the light source 12 was measured as to its pulse width and spectrum width by a (correlator-A/spectroscope-A) 13. It was confirmed that it is a Fourier transformation limiting pulse of 40 fs and 24 nm. This light pulse was passed by a distributed controller 16 constituted by four Brewster prism so as to be provided with a negative group velocity distribution so that it is measured as to pulse width and spectrum width by a (correlator-B/spectroscope-B) 14, obtaining 69 fs and 7 nm. Then passing was done for the optical probe 28 made according to the first embodiment of the present invention to measure as to pulse width and spectrum width by a (correlator-C/spectroscope-C) 15, obtaining a minimum value of the pulse width of 43 fs and a maximum value of the spectrum width of 22 nm. These values show a Fourier transformation limiting pulse similarly to the value measured by the (corelator-A/ spectroscope-A) 13, and show that a positive distribution due to the optical probe 28 is compensated for by the distribution controller 16. Incidentally, at this time the flat convex lens 31 was slightly moved by a coupling-constant varying mechanism 32 using a piezoelectric element so as to adjust the distance from the optical probe. When the distance between the flat convex lens 31 and the optical probe 28 is 40 nm, the Fourier transformation limiting pulse was obtained. If this distance is increased, the optical coupling through an evanescent light is weakened to increase the positive group velocity distribution. Accordingly, compensate is impossible by the distribution controller with a prism, and the pulse width is broadened without turning into a Fourier transformation limiting pulse. The distribution controller by a diffraction grating, in place of the distribution controller 16 due to four Brewster prisms, has an equivalent function.

Then passing was done for the optical fiber probe made according to the third embodiment of the present invention to measure as to pulse width and spectrum width by a (corelator-C/spectroscope-C) 15, obtaining a minimum value of the pulse width of 41 fs and a maximum value of the spectrum width of 23 nm. These values show a Fourier transformation limiting pulse similarly to the value measured by the (corelator-A/spectroscope-A) 13, and show that a positive distribution due to the optical probe is compensated for by the distribution controller. As a result of various evaluations on this probe similarly to the first embodiment, the similar effects to the first embodiment was obtained.

Results similar to the first and second embodiments were obtained in a short-pulse pass characteristic evaluating experiment for the optical probe of the second embodiment of the present invention. Also, various observations and measurements were carried out by attaching the present optical probe to a scanning probe microscope device similarly to the first and second embodiments. As a result, in an emission spectrochemical measurement the emission light intensity was approximately 9 times as compared to the first embodiment case, and the time dependent profile in emission light intensity became long as to attenuation time as compared to the first embodiment. This shows that the moving process in an excitation state is suppressed by simultaneous excitations at nearby several points.

Figure 9:
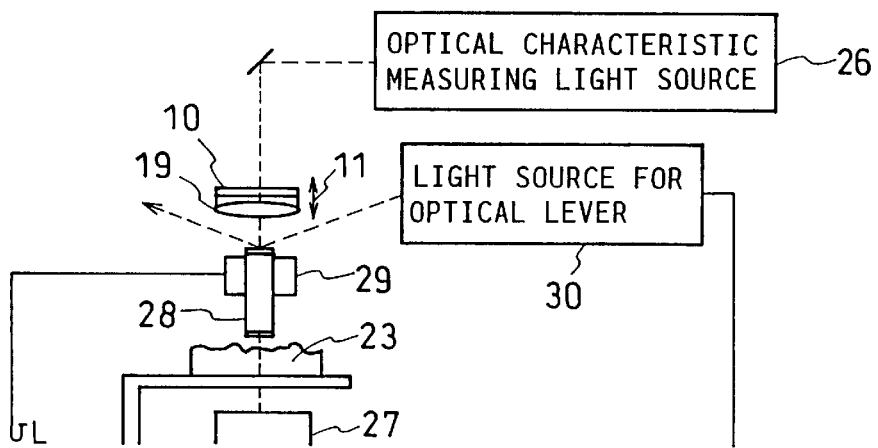
FIG. 9 is a structural view showing a scanning probe microscope using the optical probe of the present invention.

FIG. 9 shows one example of a structure that the optical probe of the present invention is attached to a scanning probe microscope. An ATM operating mechanism is the basic structure, which detects a force acting between the probe and a sample to control such that the distance therebetween becomes constant. If the optical probe of the present invention, in place of a cantilever, is employed as a probe, the usage is possible without changing the same portion. As an optical lever 30, the dielectric multilayered film 10 made at the terminal end of the optical probe can be used as a reflecting mirror. If the light from a light source 26 for measuring optical characteristics is introduced into the optical probe, an evanescent field amplified as a resonator can be created to provide favored S/N measurements. Also, it is possible, as a use method, to withdraw light through the optical probe from a sample side by reversing in position an optical characteristic measuring light detecting means 27 and a optical characteristic measuring light source 26. Where measuring fluorescent light from the sample, at that time the dielectric multilayered film 10 made on the optical probe functions as a wavelength-selecting filter for cutting excitation light to transmit fluorescent light.

The result of observations and measurements is shown hereinbelow, First, observation was made, as an application experiment to observation, on a checker pattern which has been etched alternately to a 1-$\mu$m square of a 20-nm thick Cr thin film on a glass. As a result, an image having an optical resolving power could be observed at approximately 100 nm. In particular, since the probe of the present invention has a high light intensity, an image with a high S/N ratio in the optical signal could be obtained.

Then, a time dependent profile measurement was made, as an application experiment to spectroscopic measurement, as to emission light spectrum and emission light intensity on a sample, which has been made by mixing PMMA with DODCI (3,3'-diethyl oxadicarbocyanine) to be evaporated and hot compressed due to an optical probe manufactured in the present invention, using a 532-nm wavelength excitation light of an Nd:YAG laser. As a result, it was confirmed that the light emission peak wavelength is shifted toward a longer wavelength side and shortened in fluorescent life for a high concentration of a DODCI sample with reference to a diluted DODCI sample.

Further, an optical probe for 400-nm wavelength manufactured by the above method was used to be applied in an emission spectrochemical measurement of a solid surface. As a sample was used one that has been manufactured by dissolving PMMA and rhodamine 6G in acetone to be thin-film formed by a spin-coater, while as a light source was used the above-stated titanium-sapphire laser. As a result of this, it was possible to obtain a time dependent profile measurement profile with clear light emission spectrum and light emission intensity.

What is claimed is:

1. An optical probe for use in a near-field effect microscope for performing topographical observation and physical property measurement on a surface of a sample, the optical probe comprising: an optical resonator having an optical fiber having at least one microscopic projection composed of a dielectric material disposed at an end portion of the optical fiber for transmitting light.

2. An optical probe as claimed in claim 1; wherein the at least one microscopic projection comprises a plurality of microscopic projections.

3. An optical probe as claimed in claim 1; wherein the optical resonator has a mirror having a high reflectivity for a particular wavelength of light.

4. An optical probe as claimed in claim 1; further comprising a resonant characteristic adjusting mechanism for adjusting a resonator Q factor for a particular wavelength of light.

5. An optical probe as claimed in claim 4; wherein the resonant characteristic adjusting mechanism comprises a piezoelectric element.

6. An optical probe as claimed in claim 1; wherein the optical fiber is selected from the group consisting of a single mode fiber, a step index fiber, a graded index fiber, and a polarization plane keeping fiber.

7. An optical probe as claimed in claim 1; further comprising a first reflecting mirror comprised of a dielectric multi-layered thin film disposed at a first end surface of the optical probe, and a second reflecting mirror comprised of a dielectric multi-layered film disposed at a second end surface of the optical probe opposite the first end surface.

8. An optical probe as claimed in claim 1; further comprising a first reflecting mirror comprised of a dielectric multi-layered thin film disposed at a first end surface of the optical probe, and a second reflecting mirror comprised of a coupling lens and a dielectric multi-layered thin film disposed at a second end surface of the optical probe opposite the first end surface.

9. An optical probe according to claim 1; further comprising a first reflecting mirror comprised of a thin metal film disposed at a first end surface of the optical probe, and a second reflecting mirror comprised of a thin metal thin film disposed at a second end surface of the optical probe opposite the first end surface.

10. An optical probe according to claim 1; further comprising a first reflecting mirror comprised of a thin metal film disposed at a first end surface of the optical probe, and a second reflecting mirror comprised of a coupling lens and a dielectric multi-layered thin film disposed at a second end surface of the optical probe opposite the first end surface.

11. An optical probe for use in a near-field effect microscope for performing topographical observation and physical property measurement on a surface of a sample, the optical probe comprising: a Fabry-Perot resonator having an optical fiber comprised of a quartz rod having at least one microscopic projection composed of a dielectric material disposed at an end portion thereof for transmitting light.

12. An optical probe as claimed in claim 11; further comprising a reflecting mirror comprised of a dielectric multi-layered thin film disposed at an end surface of the optical probe.

13. An optical probe as claimed in claim 11; wherein the at least one microscopic projection comprises a plurality of microscopic projections.

14. An optical probe as claimed in claim 11; wherein the optical resonator has a mirror having a high reflectivity for a particular wavelength of light.

15. An optical probe as claimed in claim 11; further comprising a resonant characteristic adjusting mechanism for adjusting a resonator Q factor for a particular wavelength of light.

16. An optical probe as claimed in claim 11; further comprising a first reflecting mirror comprised of a dielectric multi-layered thin film disposed at a first end surface of the optical probe, and a second reflecting mirror comprised of a dielectric multi-layered film disposed at a second end surface of the optical probe opposite the first end surface.

17. An optical probe as claimed in claim 11; further comprising a first reflecting mirror comprised of a dielectric multi-layered thin film disposed at a first end surface of the optical probe, and a second reflecting mirror comprised of a coupling lens and a dielectric multi-layered thin film disposed at a second end surface of the optical probe opposite the first end surface.

18. An optical probe according to claim 11; further comprising a first reflecting mirror comprised of a thin metal film disposed at a first end surface of the optical probe, and a second reflecting mirror comprised of a thin metal thin film disposed at a second end surface of the optical probe opposite the first end surface.

19. An optical probe according to claim 11; further comprising a first reflecting mirror comprised of a thin metal film disposed at a first end surface of the optical probe, and a second reflecting mirror comprised of a coupling lens and a dielectric multi-layered thin film disposed at a second end surface of the optical probe opposite the first end surface.

20. An optical probe as claimed in claim 11; further comprising a reflecting mirror comprised of a dielectric multi-layered thin film disposed at an end surface of the optical probe.

21. A method of manufacturing an optical probe, comprising the steps of:
    forming a dielectric multi-layered film by alternately depositing a dielectric thin film having a low refractive index and a dielectric thin film having a high refractive index at one end of an optical fiber;
    forming an etch mask on the dielectric multi-layered film; and
    dry-etching the dielectric multi-layered film to form a light transmitting bore at a tip of the optical fiber.

22. A method of manufacturing an optical probe according to claim 21; wherein the dry-etching step comprises plasma etching.

23. A method of manufacturing an optical probe according to claim 21; wherein the dry-etching step comprises plasma etching using fluorine gas.

24. A method of manufacturing an optical probe according to claim 21; wherein the dry-etching step comprises plasma etching using chlorine gas.

25. A method of manufacturing an optical probe according to claim 21; wherein the dry-etching step comprises plasma etching using a mixture of gases containing fluorine gas and chlorine gas.

26. A method of manufacturing an optical probe according to claim 21; wherein the dry-etching step comprises plasma etching using a mixture of gases.

27. A method of manufacturing an optical probe, comprising the steps of:

forming a dielectric multi-layered film by alternately depositing a first dielectric thin film having a low refractive index and a second dielectric thin film having a high refractive index at one end of an optical fiber;

forming an etch mask on the dielectric multi-layered film;

dry-etching the dielectric multi-layered film to form a light transmitting bore at a tip of the optical fiber;

forming a third dielectric thin film at the light transmitting bore by plasma deposition; and etching the third dielectric thin film to form a microscopic projection.

28. A method of manufacturing an optical probe according to claim 27; wherein the dry-etching step comprises plasma etching.

29. A method of manufacturing an optical probe according to claim 27; wherein the dry-etching step comprises plasma etching using fluorine gas.

30. A method of manufacturing an optical probe according to claim 27; wherein the dry-etching step comprises plasma etching using chlorine gas.

31. A method of manufacturing an optical probe according to claim 27; wherein the dry-etching step comprises plasma etching using a mixture of gases containing fluorine gas and chlorine gas.

32. A method of manufacturing an optical probe according to claim 27; wherein the dry-etching step comprises plasma etching using a mixture of gases.

33. A scanning probe microscope for detecting an interatomic force or other interaction acting between a tip of an optical probe and a sample, scanning over a surface of the sample while a distance thereof or a force acting therebetween is maintained constant, measuring a topography of the sample, and obtaining optical information of the sample, the scanning probe microscope comprising: an optical probe comprising an optical resonator having an optical fiber having at least one microscopic projection composed of a dielectric material at an end portion of the optical fiber for transmitting light; means for vibrating at least the optical probe; means for detecting a displacement of the optical probe; and control means for controlling and maintaining a distance between the optical probe and a sample.

34. A scanning probe microscope according to claim 33; further comprising a dielectric multi-layered film and a lens disposed at a terminal end of the optical probe, and a control mechanism for moving the dielectric multi-layered film and the lens.

35. A scanning probe microscope for detecting an interatomic force or other interaction acting between a tip of an optical probe and a sample, scanning over a surface of the sample while a distance thereof or a force acting therebetween is maintained constant, measuring a topography of the sample, and obtaining optical information of the sample, the scanning probe microscope comprising: an optical probe comprising a Fabry-Perot resonator having an optical fiber comprised of a quartz rod having at least one microscopic projection composed of a dielectric material at an end portion thereof for transmitting light; means for vibrating at least the optical probe; means for detecting a displacement of the optical probe; and control means for controlling and maintaining a distance between the optical probe and a sample.

36. A scanning probe microscope according to claim 35; further comprising a dielectric multi-layered film and a lens disposed at a terminal end of the optical probe, and a control mechanism for moving the dielectric multi-layered film and the lens.

* * * * *